3,851,056
METHOD OF DEPRESSING FATTY ACIDS
AND TRIGLYCERIDES
Harald Stork, Mannheim-Feudenheim, Felix Helmut Schmidt, Mannheim-Seckenheim, Max Thiel, Mannheim, Erich Fauland, Mannheim-Waldhof, and Wolfgang Kampe, Heddesheim, Germany, assignors to Boehringer Mannheim GmbH
No Drawing. Filed Oct. 14, 1971, Ser. No. 189,409
Claims priority, application Germany, Oct. 27, 1970, P 20 52 596.6
Int. Cl. A61k 27/00
U.S. Cl. 424—180
22 Claims

ABSTRACT OF THE DISCLOSURE

Therapeutic compositions having anti-lipolytic and antihyperlipaemic action containing as an active component an N(6)-substituted adenosine derivative of the formula:

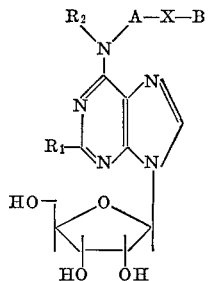

wherein, $R_1$ is hydrogen, halogen, hydroxyl, or amino;
$R_2$ is hydrogen, or straight-chained or branched alkyl;
A is a valency bond or saturated or unsaturated, straight chained, branched or cyclic alkylene, optionally substituted by hydroxyl, carboxy or acyloxy, i.e., alkanoyloxy;
X is a valency bond or, if A is alkylene, can also be oxygen or sulfur atom or optionally alkylated or acylated imino;
B is substituted or unsubstituted aryl;

and the pharmacologically compatible salts thereof.

---

The present invention is concerned with new pharmaceutical compositions and methods.

The new compositions according to the present invention contain, as an active component, at least one compound of the general formula:

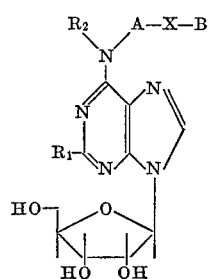

wherein, $R_1$ is hydrogen, halogen, hydroxyl, or amino;
$R_2$ is hydrogen, or straight-chained or branched alkyl;
A is a valency bond or saturated or unsaturated, straight-chained, branched or cyclic alkylene, optionally substituted by hydroxyl, carboxyl or acyloxy, i.e., alkanoyloxy;
X is a valency bond or, if A is alkylene, can also be oxygen or sulfur atom or optionally alkylated or acylated imino;
B is aryl which is optionally substituted 1 to 3 times by halogen, alkyl, haloalkyl, alkoxy, aryloxy, acyloxy, alkylthio, carboxy or hydroxyl and wherein any two substituents in "B" can together also represent a dioxomethylene bridge;

and the pharmacologically compatible salts thereof.

We have now, surprisingly, found that these derivatives of adenosine, besides their known cardiac and circulatory action, also have an anti-lipolytic and antihyperlipaemic action. Quite independently of the previously observed cardiac and circulatory action, these adenosine derivatives bring about a strong reduction in the concentration of free fatty acids and of triglycerides in the serum.

This new, surprising property can be demonstrated most simply on awake rats. Depending upon the active material administered, an intraperitoneal dose of 0.5 mg./kg. brings about, 1 hour after administration, a sinking of the free fatty acids in the serum of 40–80%. By way of comparison, at least 20 mg./kg. nicotinic acid are needed in order to bring about a corresponding depressing of the free fatty acids in the serum.

Therefore, with the use of adenosine derivatives of the above-given formula, there can be prepared pharmaceutical compositions which, besides their cardiac and circulatory action, simultaneously possess a fatty acid- and triglyceride depressing action. By the selection of certain compounds or by an appropriate mixing of two or more compounds, every ratio of cardiac and circulatory action to fatty acid- and triglyceride-sinking action can be adjusted, the physician thus being provided with a new agent for combatting such diseases brought about by civilization.

The compounds used according to the present invention and preparation thereof are disclosed in U.S. Pat. Nos. 3,502,649; 3,506,643; 3,551,409 and in British patent specifications Nos. 1,123,245; 1,143,150; 1,145,789; and 1,164,580. From the large number of compounds described in these earlier patents, the following are mentioned as preferred species:

| Compound No.: | Chemical name |
|---|---|
| 1 | N(6)-sec.-butyl-adenosine. |
| 2 | N(6)-3-methyl-pentyl-(2)-adenosine. |
| 3 | N(6)-5-methyl-hexyl-(2)-adenosine. |
| 4 | N(6)-4-methyl-hexyl-(2)-adenosine. |
| 5 | N(6)-4-methyl-pentyl-(2)-adenosine. |
| 6 | N(6)-6-methyl-heptyl-(2)-adenosine. |
| 7 | N(6)-pentyl-(2)-adenosine. |
| 8 | N(6)-(2-methyl-phenethyl)-adenosine. |
| 9 | N(6)-1-(2-hydroxy-phenyl)-propyl-(2)-adenosine. |
| 10 | N(6)-[D(+)-1-(3-methoxy-phenyl)-propyl-(2)]-adenosine. |
| 11 | (N(6)-[L-(−)-1-(3-methoxy-phenyl)-propyl-(2)]-adenosine. |
| 12 | N(6)-[1-(−)-1-(3-hydroxy-phenyl)-propyl-(2)]-adenosine. |
| 13 | N(6)-2-hydroxy-2-(o-methyl-phenyl)-ethyl-adenosine. |
| 14 | N(6)-1-(3-fluoro-4-methoxy-phenyl)-1-hydroxy-propyl-(2)-adenosine. |
| 15 | (N(6)-D-erythro-1-[3-fluoro-4-methoxy-phenyl]-1-hydroxy-propyl-(2-adenosine. |
| 16 | N(6)-D,L-threo-1-[3-fluoro-4-methoxy-phenyl]-1-hydroxy-propyl-(2)-adenosine. |

| Compound No.: | Chemical name |
|---|---|
| 17 | N(6)-*l*-1-phenoxy-propyl(2)-adenosine. |
| 18 | N(6)-D,L-1-(m-chlorophenoxy)-propyl)(2)-adenosine. |
| 19 | N(6)-3-(2,4-dichlorophenoxy)-2-hydroxy-propyl-adenosine. |
| 20 | (N(6)-2-hydroxy-3-(*p*-chloro-*m*-methyl-phenoxy)-propyl-adenosine. |
| 21 | N(6)-2-hydroxy-3-*p*-chlorophenoxy-propyl-adenosine. |
| 22 | (N(6)-2-hydroxy-3-α-naphthoxypropyl-adenosine. |
| 23 | N(6)-cyclopentyl-2-chloroadenosine. |
| 24 | N(6)-[d,1-*trans*-2-phenyl-cyclopentyl]-2-chloroadenosine. |
| 25 | N(6)-[d,1-*cis*-2-phenyl-cyclopentyl]-2-chloroadenosine. |
| 26 | N(6)-cyclohexyl-2-chloroadenosine. |
| 27 | N(6)-(*l*-1-hydroxy-butyl-2)-2-chloro-adenosine. |
| 28 | (N(6)-(*o*-trifluoromethyl-phenyl)-2-chloroadenosine. |
| 29 | N(6)-(2,5-dimethylbenzyl)-2-chloro-adenosine. |
| 30 | N(6)-d,*l*-*cis*-2-phenyl-cyclopentyl-adenosine. |
| 31 | N(6)-d,*l*-*cis*-2-phenyl-cyclohexyl-adenosine. |
| 32 | N(6)-[d,1-*trans*-2-(*m*-methoxy-phenyl)-cyclohexyl]adenosine. |
| 33 | N(6)-[d,1-*trans*-2-(*m*-methoxy-phenyl)-cyclopentyl]-adenosine. |
| 34 | N(6)-[d,1-*trans*-2-(*o*-methyl-phenyl)-cyclo-hexyl]-adenosine. |
| 35 | N(6)-[d,1-*trans*-2-phenyl-cyclohex-4-enyl]-adenosine. |
| 36 | N(6)-[d,1-*exo*-3-phenyl-norbornanyl-2-*endo*]-adenosine. |
| 37 | N(6)-3-carboxy-phenyl-adenosine. |
| 38 | N(6)-3-methoxy-4-methyl-phenyl-adenosine. |
| 39 | N(6)-D,L-*erythro*-1-hydroxy-1-phenyl-propyl-2)-N(6)-methyl-adenosine. |
| 40 | N(6)-(D-(−)-*erythro*-1-hydroxy-1-phenyl-propyl-2)-N(6)-methyl-adenosine. |
| 41 | N(6)-(D,L-*threo*-1-hydroxy-1-phenyl-propyl-2)-N(6)-methyl-adenosine. |
| 42 | N(6)-[2-hydroxy-3-(2,3-dichlorophenyl-oxy)-propyl]-adenosine. |
| 43 | N(6)-[2-hydroxy-3-(2-propoxyphenyl-oxy)-propyl]-adenosine. |
| 44 | N(6)-[2-hydroxy-3-(3-nitro-phenyl-oxy)-propyl]-adenosine. |
| 45 | N(6)-[2-hydroxy-3-(2-propen(2)-yl-phenyloxy)-propyl]-adenosine. |
| 46 | N(6)-[2-hydroxy-3-(2-propen)(2)-yloxy-phenyloxy)-propyl]-adenosine. |

The fatty acid- and triglyceride-depressing action of the compounds to be used according to the present invention is illustrated by the following experimental examples, which however, are not to be construed as unduly limitative of the invention.

Experimental Method

Male rats of the Sprague-Dawley strain with a weight of about 180–200 g., which had fasted for 16 to 18 hours, were divided up into group of 5 animals. One group of 5 animals was used in each case as a control group for comparison with animals to which the test compounds were administered. The test compounds were administered intraperitoneally in the form of solutions with a physiological pH value and the controls received the same amount of the solvent alone. One hour after administration of the test compounds, all the experimental animals were sacrificed by a blow on the neck and the venous blood collected. The content of free fatty acids in the serum was then determined by Duncombe's method (see Clin. Chim. Acta, 9, 122/1964). For the purpose of comparison, nicotinic acid was also administered intraperitoneally in amounts of 5 to 20 mg. From the following table, which gives the average values obtained from each group of 5 animals, it can be seen that only at considerably higher dosage levels does nicotinic acid lead to a comparable effect in the case of the depressing of the free fatty acids under the same experimental conditions. The individual test compounds used are indicated by our reference numbers given above. The triglycerides were determined by the method of Krautz and Eggstein.

TABLE

| | Dosage, mg./kg. | Concentration of the free fatty acids in the serum in mM./litre | | Depressing effect in percent |
|---|---|---|---|---|
| | | Control | Test animal | |
| Active compound: | | | | |
| 1 | 0.5 | 1.054 | 0.485 | −54 |
| 2 | 0.5 | 1.054 | 0.591 | −44 |
| 3 | 0.5 | 1.054 | 0.465 | −56 |
| 4 | 0.5 | 1.054 | 0.486 | −54 |
| 5 | 0.5 | 1.054 | 0.560 | −47 |
| 6 | 0.5 | 1.054 | 0.530 | −50 |
| 7 | 0.5 | 1.054 | 0.498 | −53 |
| 8 | 0.5 | 1.158 | 0.697 | −40 |
| 9 | 0.5 | 1.313 | 0.628 | −52 |
| 10 | 0.5 | 1.313 | 0.576 | −56 |
| 11 | 0.5 | 0.870 | 0.210 | −76 |
| 12 | 0.5 | 1.158 | 0.467 | −60 |
| 13 | 0.5 | 1.313 | 0.636 | −52 |
| 14 | 0.5 | 1.313 | 0.490 | −63 |
| 15 | 0.5 | 1.158 | 0.658 | −43 |
| 16 | 0.5 | 1.158 | 0.538 | −53 |
| 17 | 0.5 | 1.158 | 0.578 | −50 |
| 18 | 0.5 | 1.158 | 0.478 | −59 |
| 19 | 0.5 | 1.158 | 0.633 | −45 |
| 20 | 0.5 | 1.198 | 0.700 | −42 |
| 21 | 0.5 | 1.198 | 0.315 | −74 |
| 22 | 0.5 | 1.198 | 0.413 | −66 |
| 23 | 0.5 | 1.198 | 0.346 | −71 |
| 24 | 0.5 | 1.198 | 0.467 | −61 |
| 25 | 0.5 | 1.198 | 0.360 | −70 |
| 26 | 0.5 | 1.198 | 0.436 | −64 |
| 27 | 0.5 | 0.870 | 0.188 | −78 |
| 28 | 0.5 | 0.870 | 0.456 | −48 |
| 29 | 0.5 | 0.870 | 0.228 | −74 |
| 30 | 0.5 | 0.870 | 0.234 | −73 |
| 31 | 0.5 | 0.870 | 0.426 | −51 |
| 32 | 0.5 | 0.870 | 0.242 | −72 |
| 33 | 0.5 | 0.870 | 0.270 | −69 |
| 34 | 0.5 | 0.870 | 0.480 | −45 |
| 35 | 0.5 | 0.870 | 0.228 | −74 |
| 36 | 0.5 | 1.198 | 0.498 | −58 |
| 37 | 0.5 | 0.831 | 0.467 | −44 |
| 38 | 0.5 | 0.846 | 0.485 | −43 |
| 42 | 0.5 | 1.071 | 0.519 | −52 |
| 43 | 5.0 | 1.127 | 0.241 | −79 |
| 44 | 0.125 | 1.275 | 0.803 | −37 |
| 44 | 0.5 | 1.275 | 0.337 | −74 |
| 45 | 5.0 | 1.078 | 0.302 | −72 |
| 46 | 0.5 | 1.127 | 0.188 | −83 |
| Nicotinic acid | 5 | 1.183 | 1.040 | 0 |
| | 10 | 1.183 | 0.858 | −28 |
| (Control) | 20 | 1.183 | 0.734 | −38 |

| | Dosage, mg./kg. | Concentration of the triglyceride in the serum in mg.percent | | Depressing effect in percent |
|---|---|---|---|---|
| | | Control | Test animal | |
| Active compound: | | | | |
| 39 | 0.5 | 52 | 25 | 52 |
| 40 | 0.5 | 52 | 37 | 28 |
| 41 | 0.5 | 52 | 31 | 40 |

Thus, according to the present invention, there are provided pharmaceutical compositions with a fatty acid- and triglyceride-depressing action, which contain, as active substance at least one adenosine compound of the above-given general formula and/or at least one physiologically compatible salt thereof, in admixture with a solid pharmaceutical diluent or carrier, or in admixture with a sterile injectable liquid pharmaceutical diluent or carrier or in admixture with a liquid pharmaceutical diluent or carrier which additionally contains at least one substance selected from sweetening and flavoring agents, solubilizing agents, buffers, surface-active agents, stabilizers and preservation agents.

In the case of the use of solid pharmaceutical diluents or carriers, it is to be understood that, if desired, there can also be present at least one substance selected from sweetening flavouring agents, solubilizing agents, buffers, surface-active agents, stabilizers and preservation agents.

In the case of the use of sterile liquid pharmaceutical diluents or carriers, which are primarily intended for parenteral administration, there can, if desired or if necessary, also be present at least one substance selected from buffers, surface-active agents, solubilizing agents, stabilizers and preservation agents, as well as agents for the control and regulation of the viscosity of the sterile solutions. The preferred liquid carrier is water.

As buffers, there can be used, for example, tartrate and citrate buffers; as solubilising agents, there can be used for example, ethanol; as stabilisers, there can be used, for example, complex-forming agents, for example, ethylene-diamine-tetraacetic acid and its non-toxic salts; and as viscosity regulators, there can be used, for example, non-toxic high molecular weight polymers, for example, liquid polyethylene oxide.

In general, the pharmaceutical compositions according to the present invention can be in the form of all conventional forms for oral and parenteral administration, for example, tables, capsules, dragées, syrups, solutions, suspensions, drops, suppositories and the like. The active substance is mixed with the solid or liquid carriers or diluents and then made up into the desired form. Examples of solid carrier materials include lactose, mannitol, starch, talc, methyl-cellulose, silicic acid, calcium phosphate, magnesium stearate, agar-agar and gelatine, to which, if desired, there can be added coloring materials and/or flavoring agents and/or sweetening agents.

In the case of the sterile liquid compositions, these are advantageously placed into suitable sealed ampoules.

The pharmacologically compatible salts of the adenosine derivatives of the above-given general formula are obtainable, in conventional manner, by neutralization of the free bases with non-toxic inorganic or organic acids, for example, hydrochloric acid, sulfuric acid, phosphoric acid, hydrobromic acid, acetic acid, lactic acid, citric acid, oxalic acid, malic acid, salicyclic acid, malonic acid, maleic acid or succinic acid.

For receiving a sufficient anti-lipolytic or anti-hyperlipaemic action, the active substances to be used according to the present invention are administered one or more times daily at a dosage of 2 to 10 mg. parenterally or at a dosage of 10 to 150 mg. orally. An intravenous administration is only preferred in rare cases in which an especially rapid sinking of the serum lipids is desired or in which, for other reasons, oral administration of medicaments is contraindicated.

The following examples are given for the purpose of illustrating the present invention, and should not be construed as unduly limitative thereof:

EXAMPLE 1

Ampoule formulation 2 mg. N(6)-(D,L-erythro-1-hydroxy-1-phenyl-propyl-2)-N(6)-methyl-adenosine were dissolved in 1 ml. double distilled water, placed in a white ampoule and sterilized for 20 minutes at 120° C.

EXAMPLE 2

Ampoule formulation 10 mg. N(6)-D,L-erythro-1-hydroxy-1-phenyl-propyl-2)-N(6)-methyl adenosine were dissolved in 2 ml. double distilled water, placed in a white ampoule bottle and sterilized for 20 minutes at 120° C.

EXAMPLE 3

Table formulation

| | Mg. |
|---|---|
| N(6)-(D,L-erythro-1-hydroxy-1-phenyl-propyl-2)-N(6)-methyl-adenosine | 10 |
| Lactose | 52.5 |
| Maize starch | 52.5 |
| Methyl cellulose | 7.0 |
| Talc | 7.0 |
| Magnesium stearate | 1.0 |

Working up the active material was mixed with the lactose and maize starch and granulated with 10% maize starch paste. The granulate obtained was sieved through with a mesh size of 0.8 mm. Subsequently, the granulate was mixed with the methyl-cellulose, talc and magnesium stearate. The mixture was homogenised and pressed into tablets with a diameter of 7.0 mm. and a total weight of 130 mg.

EXAMPLE 4

Tablet formulation

| | Mg. |
|---|---|
| N(6)-(D,L-erythro-1-hydroxy-1-phenyl-propyl-2)-N(6)-methyl-adenosine | 50 |
| Lactose | 75 |
| Maize starch | 75 |
| Methyl cellulose | 14 |
| Talc | 14 |
| Magnesium stearate | 2 |

Working up: The materials were worked up to give a homogeneous mixture in the manner described in Example 3 and then pressed into tablets with a diameter of 10.0 mm. and a total weight of 230 mg.

EXAMPLE 5

Syrup formulation

| | | |
|---|---|---|
| N(6)-(D,L-erythro-1-hydroxy-1-phenyl-propyl-2)-N(6)-methyl-adenosine | g | 3.0 |
| Starch syrup | g | 65.0 |
| Kaolin supreme | g | 5.0 |
| Saccharin, sodium salt | g | 0.3 |
| Sweet orange essence | ml | 0.1 |
| p-Hydroxybenzoic acid butyl ester | g | 0.030 |
| Demineralized water ad 100.0 ml. | | |

One teaspoon of the syrup obtained in this manner contains about 150 mg. of the actual material.

It will be understood that the specification and examples are illustrative but not limitative of the present invention and that other embodiments within the spirit and scope of the invention will suggest themselves to those skilled in the art.

What is claimed is:

1. Method of depressing fatty acids and triglycerides in mammals, which comprises administering to the afflicted mammal in need of such therapy an effective amount of a compound of the general formula

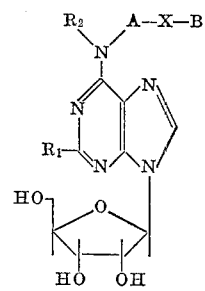

wherein $R_1$ is hydrogen, chloride, hydroxyl or amino;
$R_2$ is hydrogen, lower straight-chained or branched alkyl;

A is a valency bond or saturated or unsaturated straight-chained, lower branched or cyclic alkylene, unsubstituted or substituted by hydroxyl, carboxyl or lower acyloxy;

X is a valency bond or, if A is alkylene, can also be oxygen, sulfur, imino, lower alkylated imino, or lower acylated imino;

B is unsubstituted or substituted phenyl or naphthyl wherein the substituents are from 1 to 3 members of the group consisting of chloro or fluoro, lower alkyl, chloro- or fluoro-alkyl, alkoxy, aryloxy of from 6 to 10 carbon atoms, lower acyloxy, alkylthio, carboxy and hydroxyl and wherein any two substituents in B can together also represent a dioxomethylene bridge; and the pharmacologically compatible salts thereof.

2. Method as claimed in claim 1 wherein said compound is a N(6)-lower-alkyl-adenosine.

3. Method as claimed in claim 1 wherein A in the formula is a valency bond.

4. Method as claimed in claim 1 wherein A in said formula is lower alkylene.

5. Method as claimed in claim 1 wherein X is oxygen, sulfur, imino, lower alkylated imino or lower alkanoyl imino.

6. Method as claimed in claim 1 wherein X in the formula is a valency bond.

7. Method as in claim 1 wherein B in the formula is phenyl or naphthyl.

8. Method as claimed in claim 1 wherein B in the formula is aryl substituted 1 to 3 times by halogen, alkyl haloalkyl, alkoxy, aryloxy, acyloxy, alkylthio, carboxy or hydroxyl.

9. Method as claimed in claim 1 wherein B is phenyl or naphthyl substituted with a dioxomethylene bridge.

10. Method as claimed in claim 1 wherein said compound is N(6)-*sec.*-butyl-adenosine.

11. Method as claimed in claim 1 wherein said compound is N(6)-pentyl-(2)-adenosine.

12. Method as claimed in claim 1 wherein said compound is N(6)-[L-(—) - 1 - (3-methoxy-phenyl)-propyl-(2)]-adenosine.

13. Method as claimed in claim 1 wherein said compound is N(6)-cyclopentyl-2-chloroadenosine.

14. Method as claimed in claim 1 wherein said compound is N(6)-(*l*-1-hydroxy-butyl-2)-2-chloroadenosine.

15. Method as claimed in claim 1 wherein said compound is N(6)-[d,l-*trans* - 2 - phenyl-cyclohex-4-enyl]-adenosine.

16. Method as claimed in claim 1 wherein said compound is N(6)-(D,L-threo-1-hydroxy-1-phenyl-propyl-2)-N(6)-methyl-adenosine.

17. Method as claimed in claim 1 wherein said compound is combined with a pulverulent solid carrier.

18. Method as claimed in claim 17 wherein said carrier is a sterile liquid.

19. Method as claimed in claim 1 wherein said compound is in dosage unit form wherein each dosage unit contains from 10 to 150 mg. of said compound.

20. Method as claimed in claim 1 wherein said compound is administered at a dosage of 2 to 150 mg. per day.

21. Method as claimed in claim 1 wherein said compound is administered parenterally one or more times daily at a dosage of 2 to 10 mg.

22. Method as claimed in claim 1 wherein said compound is administered orally one or more times daily at a dosage of 10 to 150 mg.

References Cited
UNITED STATES PATENTS

| | | | |
|---|---|---|---|
| 3,502,649 | 3/1970 | Thiel et al. | 424—180 |
| 3,506,643 | 4/1970 | Thiel et al. | 424—180 |
| 3,509,129 | 4/1970 | Kampe | 424—180 |

SAM ROSEN, Primary Examiner

U.S. Cl. X.R.

424—253